United States Patent [19]

Nakamura

[11] Patent Number: 5,112,512
[45] Date of Patent: May 12, 1992

[54] SOLID POLYMER ELECTROLYTE OF AN ORGANOPOLYSILOXANE CROSSLINKED WITH POLYALKYLENE OXIDE

[75] Inventor: Takashi Nakamura, Chiba, Japan

[73] Assignee: Dow Corning Toray Silicone Company, Ltd., Tokyo, Japan

[21] Appl. No.: 584,543

[22] Filed: Sep. 18, 1990

[30] Foreign Application Priority Data

Sep. 28, 1989 [JP] Japan ................... 1-252690

[51] Int. Cl.$^5$ ............ H01B 1/12; C08G 77/46
[52] U.S. Cl. .............. 252/62.2; 252/500; 429/192; 361/527; 524/779; 528/14; 528/25
[58] Field of Search ......... 252/62.2, 500; 429/192; 361/527; 524/779

[56] References Cited

U.S. PATENT DOCUMENTS

| | | | |
|---|---|---|---|
| 4,489,191 | 12/1984 | Chung | 524/779 |
| 4,520,160 | 5/1985 | Brown | 524/765 |
| 4,798,773 | 1/1989 | Yasukawa | 252/62.2 |
| 4,845,153 | 7/1989 | Fontanille | 252/500 |
| 4,906,718 | 3/1990 | Gornowicz et al. | 528/15 |
| 5,037,712 | 8/1991 | Shackle | 429/192 |

FOREIGN PATENT DOCUMENTS

| | | |
|---|---|---|
| 216463 | 10/1985 | Japan . |
| 217263 | 10/1985 | Japan . |
| 62-209169 | 7/1987 | Japan . |
| 63-55810 | 3/1988 | Japan . |
| 0224976 | 1/1990 | Japan . |
| 0234661 | 2/1990 | Japan . |
| 0280462 | 3/1990 | Japan . |

OTHER PUBLICATIONS

Solid State Ionics, 15, (1985), 233-240.

Primary Examiner—Prince Willis, Jr.
Assistant Examiner—Thomas Steinberg
Attorney, Agent, or Firm—Edward C. Elliott

[57] ABSTRACT

An ionically conductive material comprises crosslinked copolymer prepared by the reaction of (A) organopolysiloxane and polyoxyalkylene copolymer, which has at least 2 silicon-bonded hydrogen atoms in each molecule, with (B) polyoxyalkylene having at least 2 aliphatically unsaturated hydrocarbon groups in each molecule, and (C) metal ion from Group I or Group II of the Periodic Table, wherein said metal ion is dispersed in said crosslinked copolymer. Component (B) is a polyoxyalkylene having an aliphatically unsaturated hydrocarbon group at both chain terminals or a mixture of molecules in which some have an aliphatically unsaturated hydrocarbon group at both ends and some having the group at only one end. This mixture gives the highest conductivity.

8 Claims, No Drawings

SOLID POLYMER ELECTROLYTE OF AN ORGANOPOLYSILOXANE CROSSLINKED WITH POLYALKYLENE OXIDE

BACKGROUND OF THE INVENTION

1. Field of the Invention

This invention relates to an ionically conductive material and to a method for its preparation.

2. Background Information

The development of electronic devices such as batteries, cells, display elements (ECD, etc.), and so forth has continued over the last several years in terms of higher performance, smaller size, and smaller thicknesses. In association with these developments, it is of course necessary that the ionically conductive materials used therein exhibit high performance, but they must also satisfy various advanced requirements such as solidification, high reliability, high flexibility, high moldability, moisture resistance, and so forth.

Ionically conductive materials already known in this regard are, inter alia, as follows:

(i) electrolyte solutions comprising electrolyte dissolved in water, aqueous solvent, or organic solvent;

(ii) solid electrolytes composed of an inorganic such as beta-alumina (beta-$Al_2O_3$), lithium nitride ($Li_3N$), lithium iodide/alumina ($LiI$-$Al_2O_3$), rubidium silver iodide, and so forth;

(iii) solid electrolytes in which the salt of a metal from Group I or Group II of the Periodic Table is dissolved or dispersed in a macromolecular or polymeric resin matrix.

However, due to the use of a liquid such as water or organic solvent in the material, electrolyte solutions (i) inevitably suffer from the problem of liquid leakage to the exterior of the electronic device. This leakage may cause the performance of the device to deteriorate and may damage the surroundings. In order to ameliorate this problem, ionically conductive materials in paste or gel form have been prepared by mixing polymeric or macromolecular compounds into electrolyte solutions. Nevertheless, even these materials do not completely eliminate the leakage problem. The solid electrolytes under (ii) are in fact technically applicable to highly reliable, long-lived electronic devices, and, moreover, respond to the demands for small size and increasing thinness. However, materials with a satisfactory room-temperature conductivity cannot be obtained at present, with the result that broad practical application remains unrealized. With regard to the solid electrolytes under (iii), while these can essentially solve the leakage problem as for (ii), they also offer the prospect of imparting the excellent properties characteristic of organic polymers such as high flexibility and high moldability. They have therefore received attention as materials which can respond to the broad demands of electronic devices as described above. In this regard, polymeric ionically conductive materials for use as solid electrolytes must meet the following demands:

(a) the quantity of dissolution of contained electrolyte (metal salt) must be suitably large, and the capacity for ionic dissociation must be large; and (b) the dissociated ion must be highly mobile in the polymer matrix.

Due to their relatively good conductivity, crosslinked materials containing a polyether segment (for example, PEO = polyethylene oxide, and so forth) have been extensively examined as polymer structures which satisfy the preceding conditions. However, when PEO is itself simply crosslinked, the molecular mobility is limited, and a satisfactory room-temperature conductivity is not obtained. Accordingly, in order to solve this problem, experiments have been carried out into the synthesis of solid electrolytes which combine the PEO segment with a siloxane segment (segment with very high molecular mobility). For example, Japanese Patent Application Laid Open [Kokai] Number 60-216463 [216,463/85], Japanese Patent Application Laid Open Number 60-217263 [217,263/85], and U.S. Pat. No. 4,798,773, issues Jan. 17, 1989, describe ionically conductive materials in which the lithium ion, etc., is dispersed in a crosslinked copolymer of PEO and siloxane in which linkage is achieved through the Si—O—C bond. However, the handling of these ionically conductive materials is made highly problematic by the facile scission of the Si—O—C bond in the presence of water. Otherwise, an ionically conductive material has been described in which metal ion is dispersed in a polysiloxane with polyethylene glycol side chains which has been crosslinked and solidified with difunctional isocyanate (Solid State Ionics, 15 233 (1985)). In this case, the NCO group must be added in a suitable excess relative to the OH group in order to induce curing to a satisfactory strength level. Thus, when utilized in a device such as a battery, etc., the risk arises of a reaction between residual NCO groups and the electrode material, and this problem impairs practical utilization. Furthermore, Japanese Patent Application Laid Open Number 62-209169 [209,169/87] lists crosslinking by exposure to radiation (electron beam, etc.) and crosslinking by the platinum catalyst-mediated hydrosilylation reaction as methods for the preparation of siloxane/PEO crosslinked materials, and also discloses ionically conductive material in which metal ion is dispersed in same. However, these methods require the use of organic solvent in order to compatibilize the two or more types of starting materials, which not only closes off application in some products, but also increases the complexity of the process. Among other things, these methods also risk a deterioration in the occupational environment, damage to surrounding materials, and organic solvent residues in the final product. Moreover, even given that the starting materials are miscibilized by organic solvent, phase separation can occur during the course of organic solvent evaporation, and the complete development of the crosslinking reaction can therefore not be thoroughly guaranteed. Considered in total, these methods suffer from problems in their practical application due to a reduced product quality, unsatisfactory reproducibility, and so forth.

As discussed above, the heretofore proposed solid electrolytes composed of crosslinked material from organopolysiloxane and another polymer in all cases suffer from problems with their properties or preparative method and are therefore unsuitable for application in electronic devices as listed above.

The present inventor, as the result of extensive research directed at solving these problems, discovered that material comprising a specific metal ion dispersed in a specific crosslinked copolymer does not suffer from the problems outlined above and has an excellent ionic conductivity. The present invention was achieved based on this finding.

SUMMARY OF THE INVENTION

The present invention relates to ionically conductive material which characteristically consists of crosslinked copolymer prepared by the reaction of (A) organopolysiloxane and polyoxyalkylene copolymer which has at least 2 silicon-bonded hydrogen atoms in each molecule with (B) polyoxyalkylene having at least 2 aliphatically unsaturated hydrocarbon groups in each molecule, and (C) metal ion from Group I or Group II of the Periodic Table, wherein said metal ion is dispersed in said crosslinked copolymer.

The present invention takes as its object the introduction of an ionically conductive material which exhibits an excellent ionic conductivity. In more specific terms, the present invention takes as its object the introduction of an ionically conductive material which is highly qualified for use as a solid electrolyte in electronic devices (e.g., batteries, cells, display elements, etc.) as well as the introduction of a method for preparing same.

DESCRIPTION OF THE INVENTION

This invention is to an ionically conductive material which comprises crosslinked copolymer prepared by the reaction of (A) organopolysiloxane and polyoxyalkylene copolymer which has at least 2 silicon-bonded hydrogen atoms in each molecule with (B) polyoxyalkylene having at least 2 aliphatically unsaturated hydrocarbon groups in each molecule, and (C) metal ion from Group I or Group II of the Periodic Table, wherein said metal ion is dispersed in said crosslinked copolymer.

This invention also includes a method for the preparation of ionically conductive material having the characteristic that a mixture of (A) organopolysiloxane and polyoxyalkylene copolymer having at least 2 silicon-bonded hydrogen atoms in each molecule, (B) polyoxyalkylene having at least two aliphatically unsaturated hydrocarbon groups in each molecule, in a quantity which affords a value of (1:5) to (10:1) for the ratio between the number of moles of aliphatically unsaturated hydrocarbon groups in the present component and the number of moles of silicon-bonded hydrogen atoms in component (A), and (C) the salt of a metal from Group I or Group II of the Periodic Table, at 0.5 to 20 weight parts per 100 weight parts of the total quantity of component (A) plus component (B), is cured in the presence of (D) hydrosilylation reaction catalyst.

To explain the preceding in greater detail, the copolymer comprising component (A) is the base material constituting the crosslinked copolymer of the ionically conductive material of the present invention, and it must contain at least 2 silicon-bonded hydrogen atoms in each molecule in order to generate the crosslinked copolymer. This copolymer is exemplified by organopolysiloxane with the following general formula

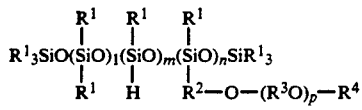

wherein the groups $R^1$ are the same or different monovalent hydrocarbon groups, $R^2$ is a divalent hydrocarbon group, $R^3$ is an alkylene group, $R^4$ is a monovalent hydrocarbon group, l is an integer with a value of zero to 1,000, m is an integer with a value of 2 to 1,000, n is an integer with a value of 1 to 1,000, and p is an integer with a value of 1 to 100. The groups $R^1$ in the formula for this organopolysiloxane comprise monovalent hydrocarbon groups, for example, alkyl groups such as methyl, ethyl, and propyl; aryl groups such as phenyl, tolyl, and xylyl; and aralkyl groups such as benzyl and phenethyl. Part of the groups $R^1$ may be replaced with the hydrogen atom, alkoxy groups, etc., in small amounts. It is preferred that methyl comprise at least half of the groups $R^1$ from the standpoints of economics and the development of a good crosslinked copolymer. $R^2$ comprises divalent hydrocarbon groups, for example, alkylene groups such as methylene, ethylene, and propylene; and arylene groups such as phenylene, tolylene, and xylylene. $R^3$ is an alkylene group such as methylene, ethylene, butylene, pentylene, hexylene, or heptylene. $R^4$ comprises monovalent hydrocarbon groups, for example, alkyl groups such as methyl, ethyl, and propyl; and acyl groups such as acetyl and propionyl. The value of l falls within the range of zero to 1,000, m within the range of 2 to 1,000, and n within the range of 1 to 1,000, and they are not particularly restricted as long as these ranges are satisfied.

The polyoxyalkylene comprising component (B) is a crosslinker for the preceding component (A), and it must contain at least 2 aliphatically unsaturated hydrocarbon groups in each molecule in order to fulfill this crosslinker function. Moreover, component (B), by introducing the PEO unit into the crosslinked copolymer, functions to support the appearance of a high ionic conductivity. This component (B) is exemplified by the following general formula.

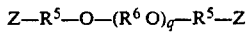

In the preceding formula, Z is an aliphatically unsaturated hydrocarbon group such as vinyl, allyl, and isopropenyl. $R^5$ is a divalent hydrocarbon group as exemplified by alkylene groups such as methylene, ethylene, propylene, butylene, pentylene, hexylene, and heptylene; and by arylalkylene and alkylarylene chain groups such as phenylpropylene and propylphenylene. $R^6$ is an alkylene group as exemplified by methylene, ethylene, propylene, butylene, pentylene, hexylene, and heptylene. The value of q falls within the range of 1 to 100 and preferably within the range of 5 to 20.

In the preceding, component (B) comprises polyoxyalkylene having at least two aliphatically unsaturated hydrocarbon groups in each molecule; however, when an even higher ionic conductivity is required, the use is preferred of such a polyoxyalkylene which also contains polyoxyalkylene having an aliphatically unsaturated hydrocarbon group at only one molecular chain terminal, as represented by the following general formula.

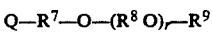

In the preceding formula, Q is an aliphatically unsaturated hydrocarbon group, $R^7$ is a divalent hydrocarbon group, $R^8$ is an alkylene group, $R^9$ is a monovalent hydrocarbon group, and r is an integer with a value of 1 to 100. This polyoxyalkylene having an aliphatically unsaturated hydrocarbon group at only one molecular chain terminal, forms a polyoxyalkylene graft chain within the crosslinked copolymer through its addition reaction with the silicon-bonded hydrogen atoms on the above-described component (A). Within the scope of the present invention, the presence of such graft chains at moderate levels operates to improve the ionic conductivity. Thus, when higher ionic conductivities are required, it will be advantageous for component (B) to contain such a polyoxyalkylene having the aliphatically unsaturated hydrocarbon group at only one molecular chain terminal. With regard to the preceding formula for this polyoxyalkylene containing an aliphatically unsaturated hydrocarbon group at only one molecular chain terminal, Q is an aliphatically unsaturated hydrocarbon group identical with the above-defined Z, $R^7$ is a divalent hydrocarbon group identical with the above-defined $R^5$, $R^8$ is an alkylene group identical with the above-defined $R^6$, and $R^9$ is a monovalent hydrocarbon group as exemplified by alkyl groups such as methyl, ethyl, and propyl; aryl groups such as phenyl and naphthyl; and acyl groups such as acetyl and propionyl.

Component (C) is the agent which imparts ionic conductivity, and this may be any metal ion from Group I or Group II of the Periodic Table. Metal ions in this regard are exemplified by the lithium, sodium, potassium, calcium, and magnesium metal ions. Among these, the lithium ion is preferred in order to raise the energy density per unit volume or per unit weight. Moreover, when the ionically conductive material of the present invention is utilized in a battery or cell, it will be necessary to select the same ion as used in the particular electrode (for example, the lithium ion when the electrode is lithium).

The component (C) under consideration is generally used in the form of a metal salt. While this may be any type of metal salt, lithium perchlorate ($LiClO_4$), lithium borofluoride ($LiBF_4$), lithium phosphofluoride ($LiPF_6$), lithium trifluoromethanesulfonate ($LiCF_3SO_3$), and lithium iodide (LiI) are preferred in order to achieve a high ionic conductivity.

With regard to its quantity of dispersion, it is preferred that [S]/[RO] (ratio of number of moles of salt [S], for example, $LiClO_4$, to the number of moles of oxyalkylene groups [RO] in the crosslinked copolymer) have values of 0.005 to 0.25 and more preferably of 0.01 to 0.05. When the value of [S]/[RO] exceeds 0.25, it becomes difficult to achieve a homogeneous dispersion of the metal salt, while it is difficult to achieve high ionic conductivities at values below 0.005.

The ionically conductive material of the present invention is readily prepared through the combination of those technical means heretofore known for use in the typical addition reaction between SiH-containing compounds and compounds having aliphatically unsaturated hydrocarbon groups, with those technical means heretofore known for the dispersion of metal salts in polymeric or macromolecular materials. The following are given by way of example:

component (D) is added to the mixture of component (A) and component (B) followed by heating to afford the crosslinked copolymer constituted of components (A) and (B), this is then swelled with organic solvent, and component (C) is admixed and dispersed;

the mixture of components (A) through (D) is heated in order to produce the crosslinked copolymer of components (A) and (B) while at the same time achieving the dispersion of component (C).

However, the following method is preferred for the preparation of the ionically conductive material of the present invention, that is: "a method for the preparation of ionically conductive material having the characteristic that a mixture of (A) organopolysiloxane and polyoxyalkylene copolymer having at least 2 silicon-bonded hydrogen atoms in each molecule, (B) polyoxyalkylene having at least two aliphatically unsaturated hydrocarbon groups in each molecule, in a quantity which affords a value of (1:5) to (10:1) for the ratio between the number of moles of aliphatically unsaturated hydrocarbon groups in the present component and the number of moles of silicon-bonded hydrogen atoms in component (A), and (C) the salt of a metal from Group I or Group II of the Periodic Table, at 0.5 to 20 weight parts per 100 weight parts of the total quantity of component (A) plus component (B), is cured in the presence of (D) hydrosilylation reaction catalyst."

To explain this in greater detail, the components (A) and (B) used herein are the same components (A) and (B) discussed in detail above in the explanation of the ionically conductive material itself.

Component (B) should be present in a proportion which affords values within the range of (1:5) to (10:1), preferably within the range of (1:2) to (5:1), and more preferably within the range of (1.0:1.0) to (1.2:1.0) for the ratio between the number of moles of unsaturated hydrocarbon groups in the component under consideration and the number of moles of silicon-bonded hydrogen atoms in component (A). While an addition reaction will occur between components (A) and (B) at any ratio to give crosslinked copolymer, unreacted silicon-bonded hydrogen atoms will tend to remain in the composition of the present invention when the number of moles of silicon-bonded hydrogen atoms in component (A) exceeds the number of moles of aliphatically unsaturated hydrocarbon groups in component (B). When the ionically conductive material thus obtained is used in, for example, a battery or cell, such ill effects occur as, inter alia, reaction between the electrode material and residual silicon-bonded hydrogen atoms.

Component (C) is again identical with the component (C) discussed in detail above in the explanation of the ionically conductive material. It should be blended at 0.5 to 20 weight parts per 100 weight parts of the sum of components (A) and (B). The ionic conductivity becomes impractically low at values below 0.5 weight parts, while a homogeneous mixture cannot be obtained when 20 weight parts is exceeded.

In the method under consideration, the mixture of components (A) through (C) is cured in the presence of component (D) (hydrosilylation reaction catalyst), and this curing proceeds based on the addition reaction between the silicon-bonded hydrogen atoms in component (A) and the aliphatically unsaturated hydrocarbon groups in component (B). Component (D) may be any hydrosilylation reaction catalyst generally known for use in this regard, and examples here are chloroplatinic acid, potassium chloroplatinate, palladium chloride, iridium chloride, iron/carbonyl complexes, ruthenium chloride, nickel chloride, and solid catalysts consisting of a supported metal such as platinum, ruthenium, etc. This hydrosilylation reaction catalyst is used in general within the range of 0.0001 to 0.1 weight parts and preferably within the range of 0.001 to 0.01 weight parts per 100 weight parts organopolysiloxane comprising component (A). While no particular restriction is placed on the addition-reaction temperature required for curing, as a general matter the reaction is conducted at from room temperature to 150 degrees Centigrade. This reaction can be conducted in the absence of solvent.

Components (A) and (B) are readily mixed to homogeneity by such processes as stirring, etc. Component (C), due to its solubility relative to the oxyalkylene chain, may be preliminarily dissolved in component (A) or component (B) or may be added after mixing component (A) and component (B). The dissolution of component (C) in the oxyalkylene chains can be achieved by processes such as stirring, and so forth, but processes such as heating or exposure to ultrasound are effective for shortening the dissolution time. Moreover, when the use of an organic solvent in the dissolution process is permissible, components (A) through (C) may be mixed and dissolved in organic solvent, which is then evaporated. Organic solvents in this regard are not specifically restricted, and examples are tetrahydrofuran, dioxane, acetonitrile, dimethylformamide, and dimethyl sulfoxide. When an organic solvent is in fact used, after thermosetting it will generally be present in the cured material in an imbibed or captured condition, which will necessitate its removal by such methods as treatment in vacuo.

Because the ionically conductive material of the present invention consists of the dispersion of metal ion comprising component (C) in a specific crosslinked copolymer composed of components (A) and (B), it is characterized by a high ionic conductivity at room temperature and by the absence of such drawbacks as leakage, collateral effects, etc., in its application in electronic devices. Moreover, its method of production is characterized by simplicity and the capacity to produce a high-quality ionically conductive material in a stable fashion.

The following examples are included for illustrative purposes only and should not be construed as limiting the invention which is properly set forth in the appended claims.

The ionic conductivity was measured by the following method.

The ionically conductive material was first molded into a film which was used as the measurement specimen. After measuring the thickness of the sample with a micrometer, round (diameter = 1 cm) plate-form platinum electrodes were adhered on both surfaces of the specimen, and the entire assembly was placed in a vacuum container capable of arbitrary temperature regulation. This was evacuated to a high vacuum of at least $10^{-5}$ torr, and, after the condition of the sample had been satisfactorily equilibrated, an alternating-current voltage of 5 Hz to 13 MHz was applied using an LCR meter (4192A from YokogawaHewlett-Packard) and the ionic conductivity was measured by the complex impedance method.

EXAMPLE 1

A mixture was prepared by mixing 0.775 g compound (1) as given below, 0.225 g compound (2) as given below, and 34.5 mg lithium perchlorate with stirring and then thoroughly dissolved with ultrasound. To this liquid mixture was added 2.47 microliter 2 weight percent isopropanolic chloroplatinic acid hexahydrate ($H_2PtCl_6 \cdot 6H_2O$) solution as hydrosilylation catalyst, and this was then poured into a 3 cm-square teflon dish and heated for 2 hours in an oven set at 70 degrees Centigrade. A transparent, 0.3 mm-thick film was obtained. This was additionally dried at 70 degrees Centigrade for 2 days in vacuo, at which point an ionic conductivity at 25 degrees Centigrade of $2.5 \times 10^{-5}$ $S \cdot cm^{-1}$ was measured.

compound (1):

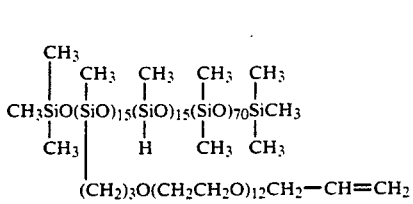

Compound (2):

EXAMPLE 2

A mixture was prepared of 0.702 g compound (1) and 0.102 g compound (2) from Example 1, 0.196 g compound (3) as given below, and 36.4 mg lithium perchlorate by stirring and then thoroughly dissolved with ultrasound. After the addition of 2.23 microliter 2 weight percent isopropanolic chloroplatinic acid hexahydrate solution as hydrosilylation catalyst, heating was carried out as in Example 1 to give a transparent, 0.3 mm-thick film. This was additionally dried at 70 degrees Centigrade for 2 days in vacuo, at which point an ionic conductivity at 25 degrees Centigrade of $4.9 \times 10^{-5}$ $S \cdot cm^{-1}$ was measured.

compound (3):

EXAMPLE 3

A mixture was prepared by mixing 0.619 g compound (1) from Example 1, 0.381 g compound (4) as shown below, and 36.8 mg lithium perchlorate with stirring and then thoroughly dissolved with ultrasound. After the addition of 1.97 microliter 2 weight percent isopropanolic chloroplatinic acid hexahydrate solution as hydrosilylation catalyst, heating was carried out as in Example 1 to give a transparent, 0.3 mm-thick film. This was additionally dried at 70 degrees Centigrade for 2 days in vacuo, at which point an ionic conductivity at 25 degrees Centigrade of $1.9 \times 10^{-5}$ $S \cdot cm^{-1}$ was measured.

compound (4):

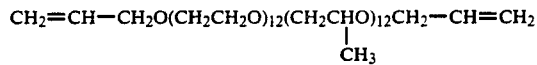

That which is claimed is:

1. Ionically conductive material which comprises crosslinked copolymer prepared by the reaction of
   (A) organopolysiloxane and polyoxyalkylene copolymer which has at least 2 silicon-bonded hydrogen atoms in each molecule with
   (B) polyoxyalkylene having at least 2 aliphatically unsaturated hydrocarbon groups in each molecule, and
   (C) metal ion from Group I or Group II of the Periodic Table, wherein said metal ion is dispersed in said crosslinked copolymer, the material having been cured by heating at from room temperature to 150° C.

2. Ionically conductive material according to claim 1 in which the copolymer comprising component (A) is organopolysiloxane as represented by the following general formula

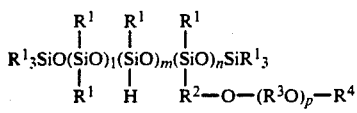

wherein the groups $R^1$ are the same or different monovalent hydrocarbon groups, $R^2$ is a divalent hydrocarbon group, $R^3$ is an alkylene group, $R^4$ is a monovalent hydrocarbon group, l is an integer with a value of zero to 1,000, m is an integer with a value of 2 to 1,000, n is an integer with a value of 1 to 1,000, and p is an integer with a value of 1 to 100.

3. Ionically conductive material according to claim 1 in which the polyoxyalkylene comprising component (B) is polyoxyalkylene having an aliphatically unsaturated hydrocarbon group at both molecular chain terminals, as represented by the following general formula

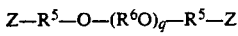

wherein Z is an aliphatically unsaturated hydrocarbon group, $R^5$ is a divalent hydrocarbon group, $R^6$ is an alkylene group, and q is an integer with a value of 1 to 100.

4. Ionically conductive material according to claim 1 in which the polyoxyalkylene comprising component (B) further contains polyoxyalkylene having an aliphatically unsaturated hydrocarbon group at one molecular chain terminal, as represented by the following general formula

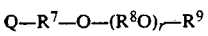

wherein Q is an aliphatically unsaturated hydrocarbon group, $R^7$ is a divalent hydrocarbon group, $R^8$ is an alkylene group, $R^9$ is a monovalent hydrocarbon group, and r is an integer with a value of 1 to 100.

5. Method for the preparation of ionically conductive material having the characteristic that a mixture of
   (A) organopolysiloxane and polyoxyalkylene copolymer having at least 2 silicon-bonded hydrogen atoms in each molecule,
   (B) polyoxyalkylene having at least two aliphatically unsaturated hydrocarbon groups in each molecule, in a quantity which affords a value of (1:5) to (10:1) for the ratio between the number of moles of aliphatically unsaturated hydrocarbon groups in the present component and the number of moles of silicon-bonded hydrogen atoms in component (A), and
   (C) the salt of a metal from Group I or Group II of the Periodic Table, at 0.5 to 20 weight parts per 100 weight parts of the total quantity of component (A) plus component (B), is cured by heating at from room temperature to 150° C. in the presence of
   (D) hydrosilylation reaction catalyst.

6. Method for the preparation of ionically conductive material according to claim 5 in which the copolymer comprising component (A) is organopolysiloxane as represented by the following general formula

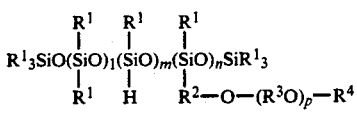

wherein the groups $R^1$ are the same or different monovalent hydrocarbon groups, $R^2$ is a divalent hydrocarbon group, $R^3$ is an alkylene group, $R^4$ is a monovalent hydrocarbon group, l is an integer with a value of zero to 1,000, m is an integer with a value of 2 to 1,000, n is an integer with a value of 1 to 1,000, and p is an integer with a value of 1 to 100.

7. Method for the preparation of ionically conductive material according to claim 5 in which the polyoxyalkylene comprising component (B) is polyoxyalkylene having an aliphatically unsaturated hydrocarbon group at both molecular chain terminals, as represented by the following general formula

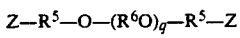

wherein Z is an aliphatically unsaturated hydrocarbon group, $R^5$ is a divalent hydrocarbon group, $R^6$ is an alkylene group, and q is an integer with a value of 1 to 100.

8. Method for the preparation of ionically conductive material according to claim 5 in which the polyoxyalkylene comprising component (B) contains polyoxyalkylene having an aliphatically unsaturated hydrocarbon group at one molecular chain terminal, as represented by the following general formula

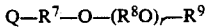

wherein Q is an aliphatically unsaturated hydrocarbon group, $R^7$ is a divalent hydrocarbon group, $R^8$ is an alkylene group, $R^9$ is a monovalent hydrocarbon group, and r is an integer with a value of 1 to 100.

* * * * *